(12) United States Patent
Kim et al.

(10) Patent No.: US 8,763,460 B2
(45) Date of Patent: Jul. 1, 2014

(54) ANGULAR VELOCITY SENSOR

(75) Inventors: Jong Woon Kim, Seoul (KR); Mao Minyao, Santa Rosa, CA (US); Lin Liwei, San Ramon, CA (US); Won Kyu Jeung, Seoul (KR)

(73) Assignee: Samsung Electro-Mechanics Co., Ltd., Suwon, Gyeonggi-Do (KR)

( * ) Notice: Subject to any disclaimer, the term of this patent is extended or adjusted under 35 U.S.C. 154(b) by 279 days.

(21) Appl. No.: 13/303,932

(22) Filed: Nov. 23, 2011

(65) Prior Publication Data

US 2012/0291547 A1    Nov. 22, 2012

(30) Foreign Application Priority Data

May 20, 2011    (KR) .................. 10-2011-0048032

(51) Int. Cl.
*G01C 19/56*    (2012.01)

(52) U.S. Cl.
USPC ........................................... 73/504.12

(58) Field of Classification Search
USPC .................................. 73/504.12, 504.14
See application file for complete search history.

(56) References Cited

U.S. PATENT DOCUMENTS

| 5,646,346 | A | | 7/1997 | Okada |
| 6,134,964 | A | * | 10/2000 | Jaenker et al. ............. 73/514.21 |
| 6,240,780 | B1 | * | 6/2001 | Negoro et al. ............. 73/504.12 |

FOREIGN PATENT DOCUMENTS

| JP | 11-072332 | 3/1999 |
| JP | 2000-337883 | 12/2000 |

OTHER PUBLICATIONS

Y. Mochida et al., "A Micromachined Vibrating Rate Gyroscope With Independent Beams for the Drive and Detection Modes," Yokohama Research & Development Center, Murata Mfg. Co., Ltd., pp. 618-623, IEEE 1999.

* cited by examiner

*Primary Examiner* — John Chapman, Jr.
(74) *Attorney, Agent, or Firm* — McDermott Will & Emery LLP

(57) ABSTRACT

There is provided an angular velocity sensor, including: a flexible part connecting a fixing part to an oscillation unit; a driving unit formed on the flexible part or the oscillation unit to oscillate the oscillation unit; a sensing unit formed on the flexible part or the oscillation unit to sense a displacement of the oscillation unit according to an angular velocity input; a control piezoelectric element formed on the flexible part to control rigidity of a motion of the oscillation unit; and an impedance element electrically connected to the control piezoelectric element to apply impedance to the control piezoelectric element.

23 Claims, 11 Drawing Sheets

ANGULAR VELOCITY SENSOR

CROSS-REFERENCE TO RELATED APPLICATIONS

This application claims the priority of Korean Patent Application No. 10-2011-0048032 filed on May 20, 2011, in the Korean Intellectual Property Office, the disclosure of which is incorporated herein by reference.

BACKGROUND OF THE INVENTION

1. Field of the Invention

The present invention relates to an angular velocity sensor, and more particularly, to an angular velocity sensor capable of improving sensitivity characteristics by controlling resonance frequencies in a driving mode and a sensing mode.

2. Description of the Related Art

Micro Electro-Mechanical Systems (MEMS) are a product of technology for manufacturing a specific portion of a system to have a delicate shape in a μm unit by using a silicon process, which means an apparatus in which mechanical parts, sensors, actuators, or electronic circuits are integrated on a single silicon substrate.

A representative application for the MEMS technology is a sensor. In particular, among sensors, MEMS are frequently used for an angular velocity sensor to measure angular velocity.

In this case, the angular velocity sensor has been widely used for various industrial applications such as home appliances, vehicles, robots, military equipment, or the like, to determine the motion, posture, and position of an object. With the development of MEMS technology, the angular velocity sensor has become inexpensive and small, such that its applications have been significantly expanded.

Sensitivity of the angular velocity sensor depends on a resonance frequency. However, the resonance frequency shows a tendency to move out of a designed value due to manufacturing distribution, environmental change, and time lapse of the angular velocity sensor.

Due to these phenomena, the sensitivity characteristics of the angular velocity sensor may be degraded. Therefore, a need exists for a method of correcting a resonance frequency so as to improve the sensitivity characteristics thereof.

The related art has improved the sensitivity of the angular velocity sensor by changing the resonance frequency according to electrostatic force generated by applying a DC bias voltage. However, the related art requires high voltage and increases power consumption, which results in limitations in the applications thereof to small-sized mobile devices.

Therefore, research into an angular velocity sensor having improved sensitivity characteristics by correcting errors of the resonance frequency according to the manufacturing distribution or the environment when mass produced, without requiring additional power consumption or the application of high voltage, is urgently needed.

SUMMARY OF THE INVENTION

An aspect of the present invention provides an angular velocity sensor which improves sensitivity characteristics by correcting resonance frequencies in a driving mode and a sensing mode and does not require additional power consumption or an application of high voltage by passively tuning the resonance frequencies.

According to an aspect of the present invention, there is provided an angular velocity sensor, including: a flexible part connecting a fixing part to an oscillation unit; a driving unit formed on the flexible part or the oscillation unit to oscillate the oscillation unit; a sensing unit formed on the flexible part or the oscillation unit to sense a displacement of the oscillation unit according to an angular velocity input; a control piezoelectric element formed on the flexible part to control rigidity of a motion of the oscillation unit; and an impedance element electrically connected to the control piezoelectric element to apply impedance to the control piezoelectric element.

The impedance of the impedance element may be set in advance or be variable.

The impedance element may be at least one of a potentiometer, a varistor, and a trimmable resistor.

The driving unit may include a piezoelectric material formed on the flexible part and deforming the flexible part by an external alternating current (AC) voltage.

The fixing part may include a fixing electrode and the driving unit may be a moving electrode forming a capacitance element with the fixing electrode to deform the flexible part by electrostatic force at the time of applying the external AC voltage.

The sensing unit may include a piezoelectric material or a piezoresistive element formed on the flexible part to output electrical signals according to the deformation of the flexible part.

The fixing part may include a fixing electrode and the sensing unit may be a moving electrode forming a capacitance element with the fixing electrode to output electrical signals according to the displacement of the oscillation unit.

The control piezoelectric element may include an upper electrode, a lower electrode coupled with the flexible part, and a piezoelectric material disposed between the upper electrode and the lower electrode.

The impedance element may be electrically connected to the upper electrode and the lower electrode.

At least one of the driving unit and the sensing unit may include an upper electrode, a lower electrode coupled with the flexible part, and a piezoelectric material disposed between the upper electrode and the lower electrode.

At least one of the upper electrode, the lower electrode, and the piezoelectric material of the driving unit or the sensing unit may be connected to correspond to at least one of the upper electrode, the lower electrode, and the piezoelectric material of the control piezoelectric element and may be integrally formed therewith.

According to another aspect of the present invention, there is provided an angular velocity sensor, including: first and second flexible parts connecting a fixing part to an oscillation unit; a driving unit formed on the first flexible part or on the oscillation unit to oscillate the oscillation unit; a sensing unit formed on the second flexible part or the oscillation unit to sense a displacement of the oscillation unit according to an angular velocity input; a control piezoelectric element formed on at least one of the first flexible part and the second flexible part to control rigidity of the driving unit or the sensing unit; and an impedance element electrically connected to the control piezoelectric element to apply impedance to the control piezoelectric element.

The impedance of the impedance element may be set in advance or be variable.

The impedance element may be at least one of a potentiometer, a varistor, and a trimmable resistor.

The driving unit may oscillate the oscillation unit in a first direction and the sensing unit may sense the displacement of the oscillation unit oscillating in a third direction that is a direction of a cross product of the first direction and the second direction according to an angular velocity input in the second direction.

The first and second flexible parts, the driving unit, the sensing unit, the control piezoelectric element, and the impedance elements may be formed in plural.

The driving unit may include a piezoelectric material formed on the first flexible part and deforming the first flexible part by an external AC voltage.

The fixing part may include a fixing electrode and the driving unit may be a moving electrode forming a capacitance element with the fixing electrode to deform the first flexible part by electrostatic force at the time of applying the external AC voltage.

The sensing unit may include a piezoelectric material or a piezoresistive element formed on the second flexible part to output electrical signals according to the deformation of the second flexible part.

The fixing part may include a fixing electrode and the sensing unit may be a moving electrode forming a capacitance element with the fixing electrode to output electrical signals according to the displacement of the oscillation unit.

The control piezoelectric element may include an upper electrode, a lower electrode coupled with the flexible part, and a piezoelectric material disposed between the upper electrode and the lower electrode.

At least one of the driving unit or the sensing unit may include an upper electrode, a lower electrode coupled with the flexible part, and a piezoelectric material disposed between the upper electrode and the lower electrode.

At least one of the upper electrode, the lower electrode, and the piezoelectric material of the driving unit or the sensing unit may each be connected to correspond to at least one of the upper electrode, the lower electrode, and the piezoelectric material of the control piezoelectric element and may be integrally formed therewith.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
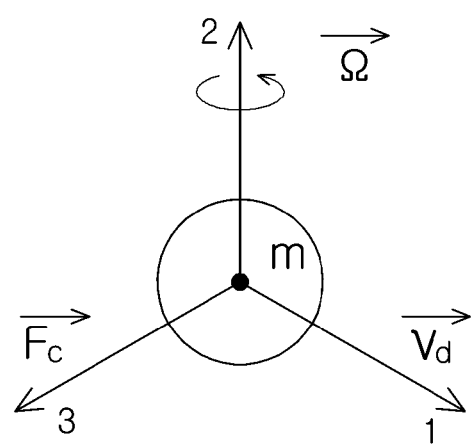
FIG. 1 is a conceptual diagram showing an operational principle of an angular velocity sensor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

Figure 2A:
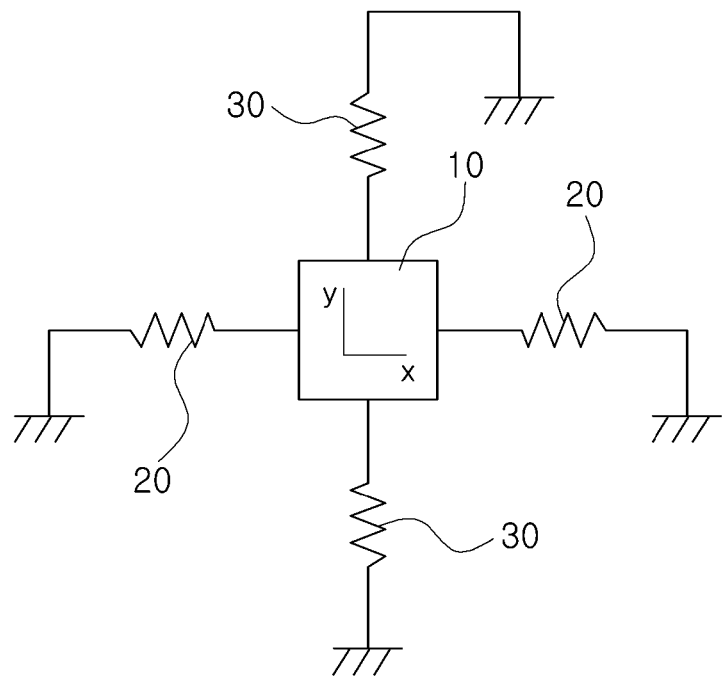
FIGS. 2A and 2B are basic conceptual diagrams for explaining a mechanical system generating resonance of a driving unit and a sensing unit of an angular velocity sensor according to an embodiment of the present invention and frequency response characteristics.
Figure 2B:
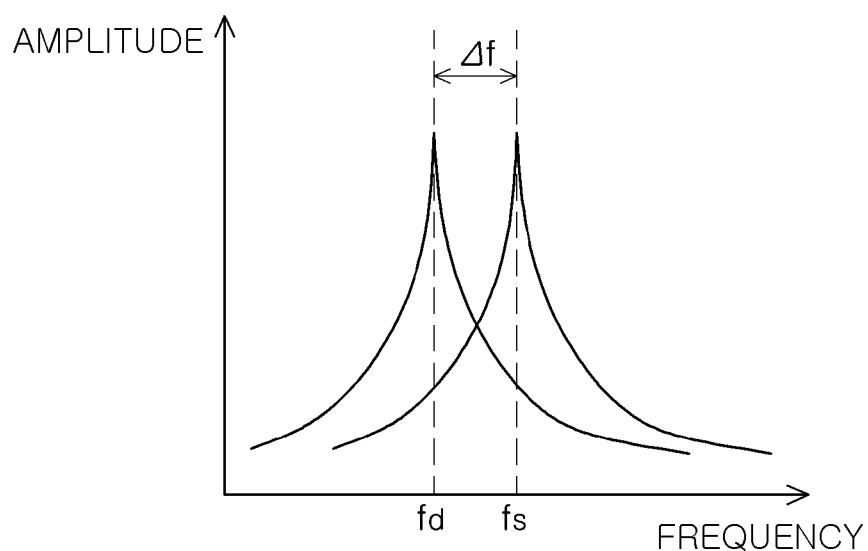

FIG. 1 is a conceptual diagram showing an operational principle of an angular velocity sensor according to an embodiment of the present invention and FIGS. 2A and 2B are basic conceptual diagrams for explaining a mechanical system generating resonance of a driving unit and a sensing unit of an angular velocity sensor according to an embodiment of the present invention and frequency response characteristics.

Referring to FIG. 1, an operational principle of an angular velocity sensor may be provided to sense angular velocity ($\Omega$) by sensing a displacement of an object (m) according to Coriolis force (Fc) when the object m moves at velocity of Vd.

In other words, a basic principle of the angular velocity sensor may be provided to sense the Coriolis force (Fc) applied to the rotating object (m) and obtains angular velocity ($\Omega$) corresponding thereto.

As shown in FIG. 1, when an object having a mass (m) moves in a first direction 1 at velocity of Vd and has angular velocity ($\Omega$) in a second direction 2, Coriolis force $\vec{F}_c = 2m\, \vec{v}_d \times \vec{\Omega}$ is applied to the object (m) in a direction of a cross product of the first direction 1 and the second direction 2.

In this case, when the object (m) moves at a velocity of Vd and the displacement of the object (m) according to the Coriolis force (Fc) is sensed, the angular velocity ($\Omega$) in proportion to the displacement of the object (m) may be measured.

Referring to FIGS. 2A and 2B, in order to improve characteristics for sensitivity in the angular velocity sensor, a driving velocity and a sensing displacement of an oscillation unit 10 are to be large.

To this end, as shown in FIGS. 2A and 2B, a 2 degree of freedom system, which may include flexible parts 20 and 30 serving as a spring and the oscillation unit 10 having a mass (m), is designed to generate mechanical resonance of a driving mode and a sensing mode.

A spring constant of the first flexible part 20 determining a motion of the driving mode may be Kd, a spring constant of the second flexible part 30 determining a motion of the sensing mode may be Ks, a resonance frequency of the driving mode may be $$f_d = \frac{1}{2\pi}\sqrt{\frac{K_d}{m}}$$

and a resonance frequency of the sensing mode may be $$f_s = \frac{1}{2\pi}\sqrt{\frac{K_s}{m}}$$

when disregarding the influence of damping.

In this case, as the resonance frequency fd of the driving mode and the resonance frequency fs of the sensing mode approximate each other, the sensitivity characteristics of the angular velocity sensor may be improved.

That is, the characteristics of the angular velocity sensor may be changed according to a minute change in the difference Δf between the resonance frequencies of the driving mode and the sensing mode.

Therefore, in order to manufacture an angular velocity sensor having excellent sensitivity characteristics, the difference Δf between the resonance frequencies of the driving mode and the sensing mode is determined in advance to select the flexible parts 20 and 30 having spring constants (Kd, Ks), such that the angular velocity sensor may be manufactured.

However, the spring constants (Kd, Ks) of the flexible parts 20 and 30 are determined according to dimensions of a structure, rigidity of a material, and residual stress, which have manufacturing distribution, are changed according to surrounding environmental factors such as temperature, humidity, and have aging properties when products are operated or stored.

Since it is difficult to set and maintain the Δf to an optimal value due to the above-mentioned properties, the sensitivity characteristics of the angular velocity sensor may be degraded.

Therefore, when the resonance frequencies (fd, fs) of the driving mode and the sensing mode are corrected by control piezoelectric elements A, B, C, and D (see FIG. 3) and an impedance control unit 180 (see FIG. 7) including the control piezoelectric elements A, B, C, and D that will be described below, an angular velocity sensor having improved sensitivity characteristics may be implemented.

Figure 3:
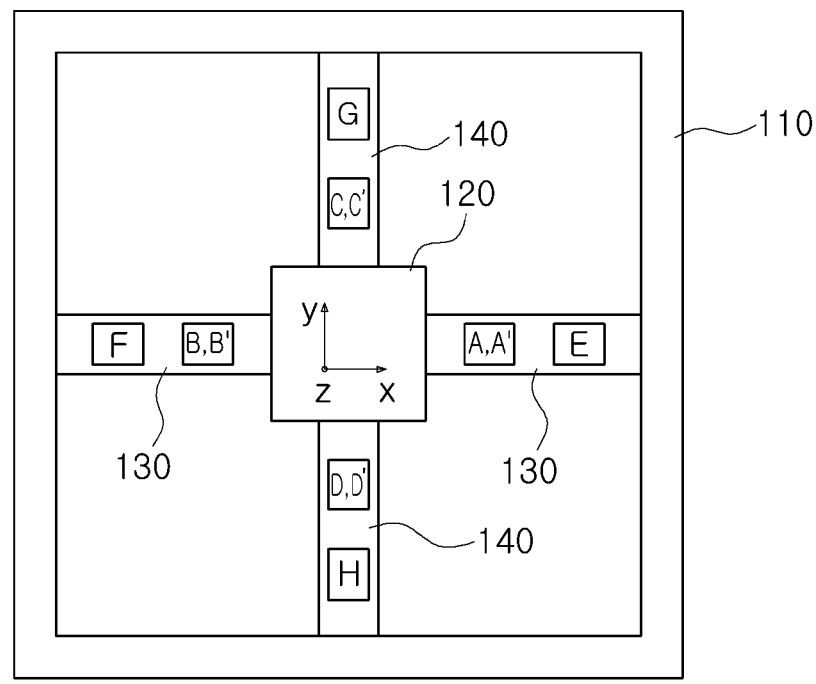
FIG. 3 is a basic structure diagram showing the angular velocity sensor according to an embodiment of the present invention.

FIG. 3 is a basic structural diagram showing the angular velocity sensor according to the embodiment of the present invention.

Referring to FIG. 3, an angular velocity sensor 100 according to an embodiment of the present invention may include a first flexible part 130 and a second flexible part 140 connecting a fixing part 110 and an oscillation unit 120, driving units E and F, sensing units G and H, control piezoelectric elements A, B, C, and D, and impedance elements A', B', C', and D'.

In this case, defining terms for directions, left and right directions are defined as an x axis, up and down directions are defined as a y axis, and forward and backward directions are defined as a z axis in FIG. 3.

The oscillation unit 120 is disposed in the empty fixing part 110 and is connected by two first and two second flexible parts 130 and 140, to oscillate based on the fixing part 110. Meanwhile, the oscillation unit 120 may oscillate in x, y and z-axis directions by the driving units E and F.

The angular velocity sensor 100 which may oscillate in the x, y, and z-axis directions may be referred to as a multi-axis angular velocity sensor 100 and the operational principle thereof will be described below with reference to FIGS. 9 through 17.

In this configuration, the first and second flexible parts 130 and 140 may be beam type elastic members having spring constants and the top surfaces of the first and second flexible parts 130 and 140 may be disposed with the driving units E and F and the sensing units G and H, respectively.

However, it is to be noted that the driving units E and F and the sensing units G and H are not limited to being disposed on the first and second flexible parts 130 and 140 and may be disposed on the oscillation unit 120.

Each of the two first flexible parts 130 disposed along the x axis is provided with the driving units E and F and the control piezoelectric elements A and B for controlling the resonance frequency and when electrical driving signals of alternating current having a frequency f are applied to the driving units E and F at a phase difference, the first flexible part 130 is deformed to oscillate the oscillation unit 120 in the x-axis direction.

In this case, as a resonance frequency fd of the driving mode oscillating in the x-axis direction and the resonance frequency f of the driving signal approximate each other, the amplitude of the oscillation unit 120 may be increased due to resonance.

In addition, when the z-axis directional angular velocity is input, the Coriolis force in the y-axis direction to the oscillation unit may serve as the frequency f.

The two flexible parts 140 disposed along a y axis are provided with the sensing units G and H and the control piezoelectric elements C and D for controlling the resonance frequency and are deformed by the Coriolis force according to angular velocity input.

In this case, when a magnitude of the input angular velocity is obtained by sensing electrical signals generated from the sensing units G and H, and as the resonance frequency fs of the sensing mode oscillating in the y-axis direction and the frequency f of the driving signal approximate each other, the deformation of the second flexible part 140 is increased by the resonance and thus, the output signal is amplified.

The driving units E and F are apparatuses oscillating the oscillation unit 120 and may be formed of a piezoelectric material so as to deform the first flexible part 130 by the external AC voltage.

In other words, the driving units E and F may include an upper electrode 150a (see FIGS. 8A and 8B), a lower electrode 150c (see FIGS. 8A and 8B) coupled with the top surface of the first flexible part 130, and a piezoelectric material 150b (see FIGS. 8A and 8B) disposed between the upper electrode 150a and the lower electrode 150c.

In this configuration, when the external AC voltage is applied, the first flexible part 130 is subjected to bending deformation in a repetitive convex and concave manner due to repetitive expansion and shrinkage of the piezoelectric material 150b and thus, the oscillation unit 120 is oscillated.

In this case, at least one of the upper electrode 150a, the lower electrode 150c, and the piezoelectric material 150b may be connected to correspond to one of the control piezoelectric elements A and B or may be integrally formed therewith, which will be described below with reference to FIGS. 8A and 8B.

In addition, the driving units E and F may also be implemented by a capacitance element rather than the piezoelectric material. In this case, the fixing part 110 may include a fixing electrode 310' (see FIG. 17) and the driving units E and F may be configured of the fixing electrode 310' and a moving electrode 330' (see FIG. 17) so as to deform the first flexible part 130 by the electrostatic force with the fixing electrode 310' at the time of applying the external AC voltage so as to form the capacitance element.

The driving units E and F using the above-mentioned capacitance element will be described below with reference to FIG. 17.

The sensing units G and H may sense the displacement of the oscillation unit 120 when the oscillation unit 120 oscillating by the driving units E and F oscillates in other directions according to the external angular velocity input and may include the piezoelectric material 150b (see FIGS. 8A and 8B), similar to the structure of the driving units E and F.

In other words, the sensing units G and H that are formed on the second flexible part 140 may include the piezoelectric material 150b so as to output electrical signals according to the deformation of the second flexible part 140.

In other words, the sensing units G and H may include the upper electrode 150a (see FIGS. 8A and 8B), the lower electrode 150c (see FIGS. 8A and 8B) coupled with the top surface of the second flexible part 140, and the piezoelectric material 150b (see FIGS. 8A and 8B) disposed between the upper electrode 150a and the lower electrode 150c and may be configured of a piezoresistive element.

In this case, at least one of the upper electrode 150a, the lower electrode 150c, and the piezoelectric material 150b may be connected to correspond to one of the control piezoelectric elements C and D or may be integrally formed therewith, which will be described below with reference to FIGS. 8A and 8B.

In addition, the sensing units G and H may be implemented by a capacitive element rather than a piezoelectric material. In this case, the sensing units G and H may include a fixing electrode 310' (see FIG. 17) and moving electrodes 340a' and 340b' to output electrical signals according to the displacement of the oscillation unit 320 (first mass body 320a and second mass body 320b) by forming a capacitance element.

The sensing units G and H using the above-mentioned capacitance element will be described below with reference to FIG. 17.

In this case, the driving units E and F oscillate the oscillation unit 120 in the first direction by external AC voltage and the sensing units E and F sense the displacement generated in a third direction that is a direction of a cross product of the first direction and the second direction to extract the angular velocity input value.

The control piezoelectric elements A, B, C, and D may be components controlling rigidity of the motion of oscillation unit 120 and may be formed on at least one of the first flexible part 130 and the second flexible part 140.

In other words, the control piezoelectric elements A, B, C, and D may be components controlling the resonance frequencies of the driving mode and the sensing mode that correspond to the motion of the oscillation unit 120 in the first direction or in the third direction.

As described above, the control piezoelectric elements A, B, C, and D may be provided as elements correcting the resonance frequencies so that the angular velocity sensor having improved sensitivity characteristics may be obtained as the resonance frequency of the driving mode and the resonance frequency of the sensing mode approximate each other.

The control piezoelectric elements A, B, C, and D may include an upper electrode 160a (see FIG. 4), a lower electrode 160c (see FIG. 4) coupled with the top surface of at least one of the first and second flexible parts 130 and 140, and a piezoelectric material 160b (see FIG. 4) disposed between the upper electrode 160a and the lower electrode 160c. At least one of the components may be connected to correspond to at least one of the upper electrode 150a, the piezoelectric material 150b, and the lower electrode 150c of the driving units E and F or the sensing units G and H or may be integrally formed therewith, which will be described below with reference to FIGS. 8A and 8B.

The impedance elements A', B', C', and D' are components that are electrically connected to the control piezoelectric elements A, B, C, and D to provide impedance to the control piezoelectric elements A, B, C, and D and are shown in FIG. 3, similar to the control piezoelectric elements A, B, C, and D, for convenience.

The impedance elements A', B', C', and D' may approximate the resonance frequency of the driving mode and the resonance frequency of the sensing mode to each other.

In this case, an impedance control unit 180 (see FIG. 7) may generally include the impedance elements A', B', C', and D', the control piezoelectric elements A, B, C, and D, a control unit 170 (see FIG. 7) controlling the impedance value of the impedance elements A', B', C', and D', and wirings electrically connecting the components.

That is, the impedance control unit 180 may include the impedance elements A', B', C', and D' and the impedance of the impedance elements A', B', C', and D' may be determined in advance or be variable.

That is, the impedance control unit 180 including the impedance elements A', B', C', and D' may implement the angular velocity sensor 100 having the improved sensitivity characteristics by correcting spring constants of the first and second flexible parts 130 and 140 determining the resonance frequency of the driving mode and the resonance frequency of the sensing mode after manufacturing the angular velocity sensor or controlling the spring constant thereof during the operation.

This will be described below with reference to FIGS. 4 through 7.

In addition, the impedance elements A', B', C', and D' maybe configured of at least one of a potentiometer, a varistor, and a trimmable resistor.

In addition, it is to be noted that the above-mentioned first and second flexible parts 130 and 140, the driving units E and F, the sensing units G and H, the control piezoelectric elements A, B, C, and D, and the impedance elements A', B', C', and D' are configured in plural to control the resonance frequency.

Figure 4:
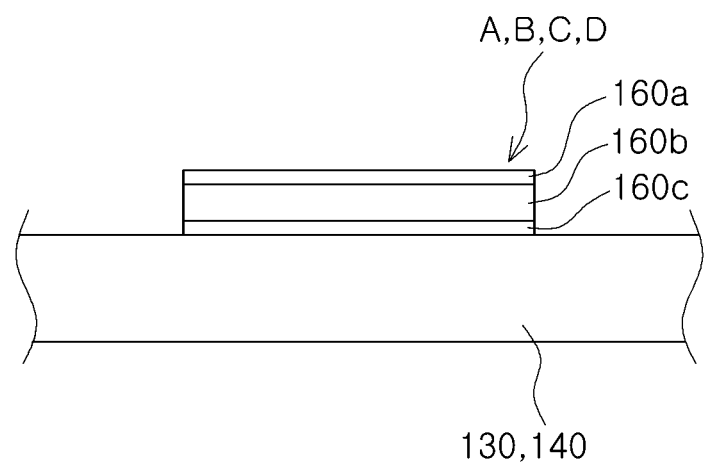
FIGS. 4 and 5A and 5B are basic structural diagrams showing an operational principle of a control piezoelectric element included in the angular velocity sensor according to an embodiment of the present invention.
Figure 5A:
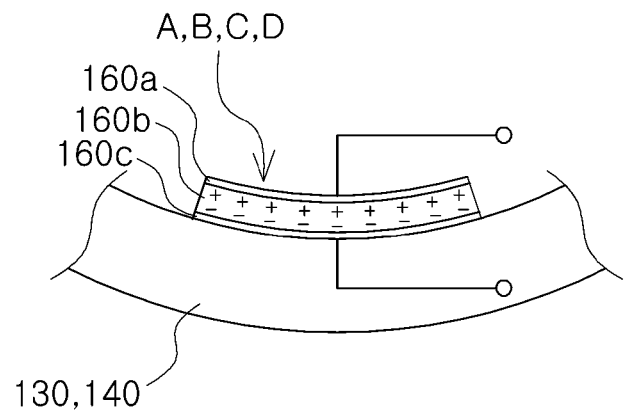
Figure 5B:
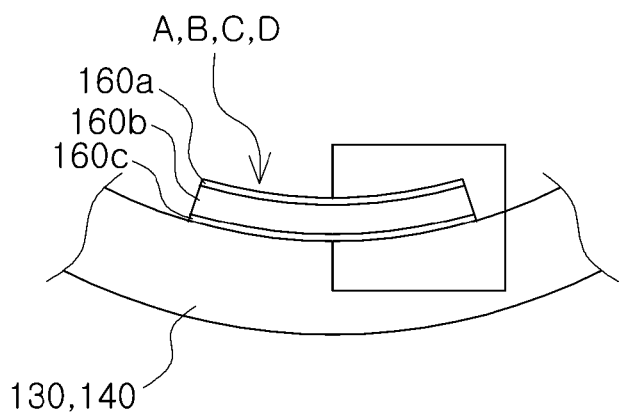
Figure 6:
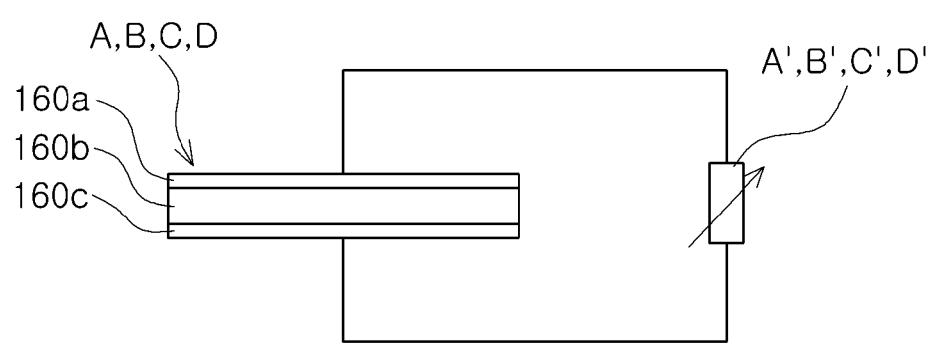
FIGS. 6 and 7 are circuit diagrams showing a relationship between the control piezoelectric element and an impedance element included in the angular velocity sensor according to an embodiment of the present invention.
Figure 7:
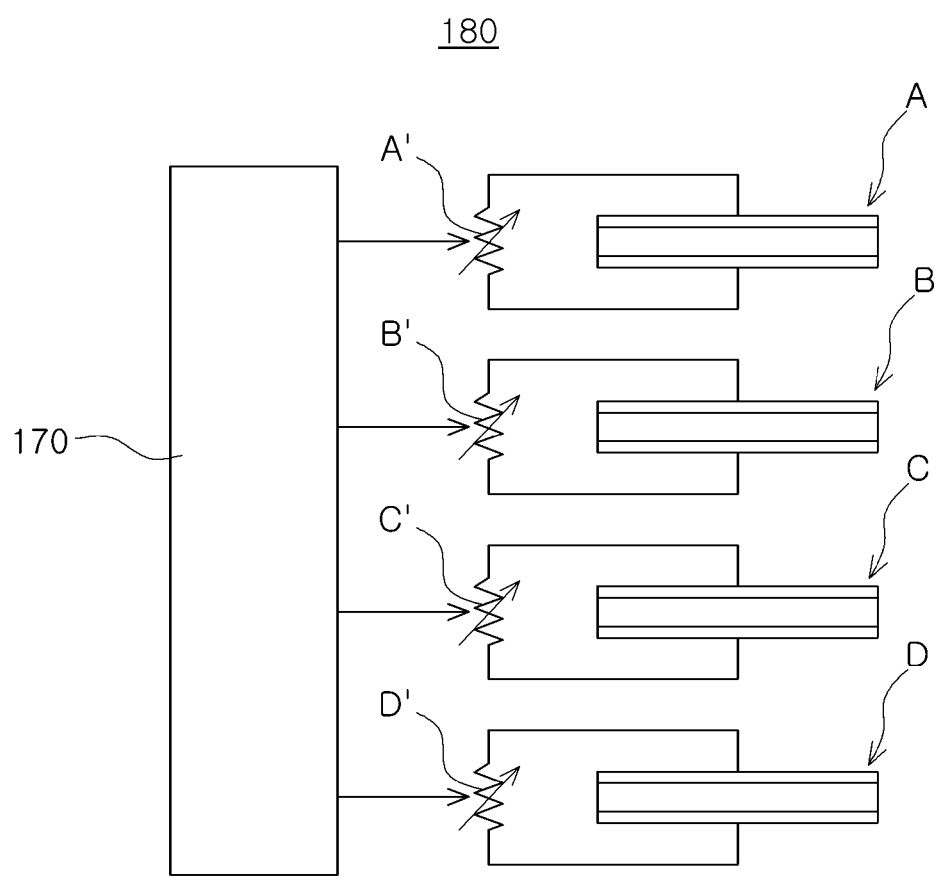

FIGS. 4 and 5A and 5B are basic structural diagrams showing an operational principle of the control piezoelectric element included in the angular velocity sensor according to the embodiment of the present invention and FIGS. 6 and 7 are circuit diagrams showing a relationship between the control piezoelectric element and an impedance element included in the angular velocity sensor according to the embodiment of the present invention.

Referring to FIG. 4, at least one of the beam type of first and second flexible parts 130 and 140 shown in FIG. 3 may be provided with the control piezoelectric elements A, B, C and D and the control piezoelectric elements A, B, C, and D may include the upper electrode 160a, the lower electrode 160c coupled with the top surface of at least one of the first and second flexible parts 130 and 140, and the piezoelectric material 160b formed between the upper electrode 160a and the lower electrode 160c.

The upper electrode 160a and the lower electrode 160c may be electrically connected with the impedance elements A', B', C', and D' of the impedance control unit 180 (see FIG. 7) and may control the resonance frequencies of the driving mode and the sensing mode by the impedance elements A', B', C', and D'.

In this configuration, FIG. 5 is a diagram for explaining a situation in which the first or second flexible parts 130 and 140 are subjected to bending deformation to apply tension stress or compression stress to the piezoelectric material 160b in a state in which both electrodes of the control piezoelectric elements A, B, C, and D, that is, the upper and lower electrodes 160a and 160c are electrically opened and shorted.

The piezoelectric material 160b forms an electrical response like charge by a forward piezoelectric effect when mechanical stress is applied thereto and generates resistance force against stress by preventing charges from being drained to the outside from the piezoelectric material 160b when the electrode of the piezoelectric material 160b is opened by a reverse piezoelectric effect.

This results in an increase in the rigidity of the piezoelectric material 160b, thereby changing spring constants of the first and second flexible parts 130 and 140 coupled with the piezoelectric material 160b.

On the other hand, when the electrode of the piezoelectric material 160b is shorted, the above-mentioned effect cannot be obtained, such that the piezoelectric material 160b may maintain the original rigidity thereof.

The above-mentioned effect may be similarly applied even in a case in which the first and second flexible parts 130 and 140 are subjected to twisting deformation and shear stress is applied to the piezoelectric material 160b.

Referring to FIGS. 6 and 7, the impedance control unit 180 may include the impedance elements A', B', C', and D', the control piezoelectric elements A, B, C, and D, a control unit 170 controlling the impedance value of the impedance elements A', B', C', and D', and the wirings electrically connecting the components.

The control piezoelectric elements A, B, C, and D may be electrically connected to the impedance elements A', B', C', and D' for controlling the spring constants of the first and second flexible parts 130 and 140.

As described above, the impedance control unit, which is a unit changing the rigidity of the piezoelectric material 160b of the control piezoelectric elements A, B, C, and D is to electrically connect the control piezoelectric elements A, B, C, and D with the impedance elements A', B', C', and D'.

In this case, open and short maybe used so as to change the impedance value of the impedance elements A', B', C', and D' of the impedance control unit 180.

That is, the impedance control unit 180 may include the impedance elements A', B', C', and D' varying the impedance value, that is, the resistance value or the capacitance value and may stepwise control the degree of open and short of the electrode of the control piezoelectric elements A, B, C, and D by changing the impedance value of the impedance elements A', B', C', and D' from 0 to infinity.

spring constants of the first and second flexible parts 130 and 140 maybe corrected by controlling the impedance of the impedance elements A', B', C', and D', such that the angular velocity sensor 100 having improved sensitivity characteristics may be implemented.

The following Table 1 shows results of simulating the resonance frequencies of the driving mode and the sensing mode by a mechanical-electrical coupled finite element method according to the open or short state of the control piezoelectric elements A, B, C, and D through the impedance control of the impedance elements A', B', C', and D' when two control piezoelectric devices A, B, C, and D are disposed on each of the first flexible part 130 and the second flexible part 140.

The table below shows finely controlling the difference Δf between the resonance frequency of the driving mode and the resonance frequency of the sensing mode when controlling the open state or the short state.

TABLE 1

| Open and short state of control piezoelectric elements (A, B, C, D) | | | | Resonance frequencies of driving mode fd | Resonance frequencies of sensing mode fs | Difference between resonance frequencies Δf |
|---|---|---|---|---|---|---|
| A | B | C | D | | | |
| Short | Short | Short | Short | 100.626 | 100.731 | 0.105 |
| Open | Short | Short | Short | 100.626 | 100.802 | 0.176 |
| Open | Open | Short | Short | 100.626 | 100.918 | 0.292 |
| Short | Short | Open | Short | 100.699 | 100.735 | 0.035 |
| Short | Short | Open | Open | 100.731 | 100.813 | 0.082 |
| Open | Short | Open | Short | 100.700 | 100.810 | 0.110 |
| Open | Open | Open | Open | 100.813 | 100.919 | 0.106 |

The method of correcting the resonance frequency by the impedance control unit 180 including the above-mentioned impedance elements A', B', C', and D' may be referred to as a passive tuning method capable of correcting the difference Δf between the resonance frequencies of the driving mode and the sensing mode without additional power consumption or applying high voltage, unlike the method of controlling the resonance frequency by applying DC bias to the capacitance element of the related art.

In this case, the control method for the case in which Δf is tuned to 0 is as follows.

When the fd is larger than the fs, the control unit 170 may reduce the impedance value of A' and B' to reduce the spring constant of the first flexible part 130 or may increase the impedance value of C' and D' to increase the spring constant of the second flexible part 140.

When the fs is larger than the fd, the control unit 170 may increase the impedance value of A' and B' to increase the spring constant of the first flexible part 130 or may reduce the impedance value of C' and D' to reduce the spring constant of the second flexible part 140.

In this case, even though the above-mentioned structure is formed as the structure having any one of the piezoelectric element pair A-B and the piezoelectric element pair C-D, the function of controlling the resonance frequency may be valid.

In the case of the structure in which the spring constants of the first flexible part 130 and the second flexible part 140 are coupled with each other, the spring constant of the second flexible part 140 may be controlled by the control piezoelectric elements A and B formed on the first flexible part 130, and vice versa.

In this configuration, the structure in which the control piezoelectric elements A, B, C, and D are formed on the first and second flexible parts 130 and 140 is not limited to the above description and thus, the present invention can be applied to any structure in which the modification of the first and second flexible parts 130 and 140 may generate stress to the piezoelectric material 160b.

In addition, when correcting the manufacturing distribution of the resonance frequency, the resistance value implementing the desired Δf using the trimmable resistor as the variable impedance element may be set as described above.

In order to compensate for the variations of the resonance frequency during the operation, the potentiometer or the varistor as the variable impedance elements A', B', C', and D' of the impedance control unit 180 feedbacks the measurement value of the resonance frequency to control the resistance value to implement the desired Δf.

In order to implement the miniaturization of the product, a controlling method can also be performed in the integrated circuit.

Figure 8A:
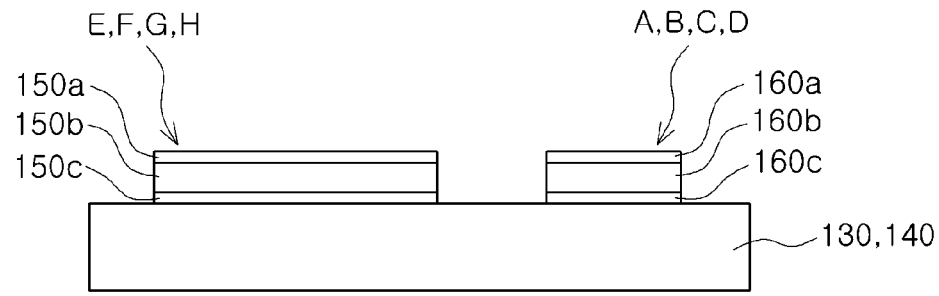
FIGS. 8A and 8B are schematic cross-sectional views showing a structure of the driving unit or the sensor unit and the control piezoelectric element of the angular velocity sensor according to an embodiment of the present invention.
Figure 8B:
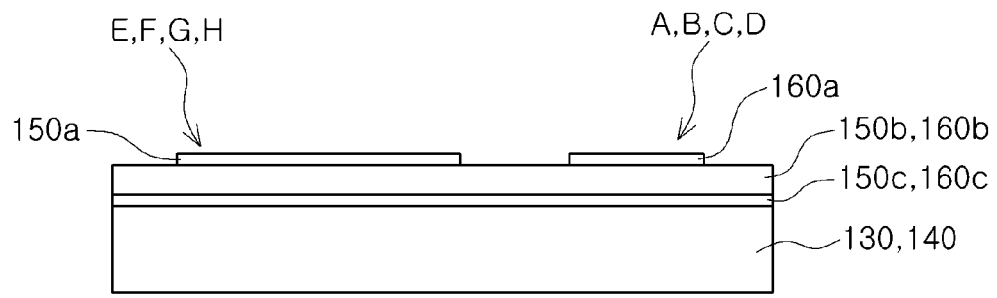

FIGS. 8A and 8B are schematic cross-sectional views showing a structure of the driving unit or the sensor unit and the control piezoelectric element of the angular velocity sensor according to an embodiment of the present invention.

The driving units E and F, the sensing units G and H, and the control piezoelectric elements A, B, C, and D may include the upper electrodes 150a and 160a, the piezoelectric materials 150b and 160b, and the lower electrodes 150c and 160c, wherein at least one of the upper electrodes 150a and 160a, the piezoelectric materials 150b and 160b, and the lower electrodes 150c and 160c of the driving units E and F and the control piezoelectric elements A and B may be connected to each other or may be integrally formed therewith.

Similarly, the relationship between the sensing units G and H and the control piezoelectric elements C and D may be the same.

In this case, when a distance between the electrodes 150a and 150c of the driving units E and F or the sensing units G and H and the electrodes 160a and 160c of the control piezoelectric elements A, B, C, and D is equal to or greater than a predetermined distance, the influence therebetween may be disregarded, and therefore, the above components may be connected to each other or may be integrally formed therewith.

Figure 9:
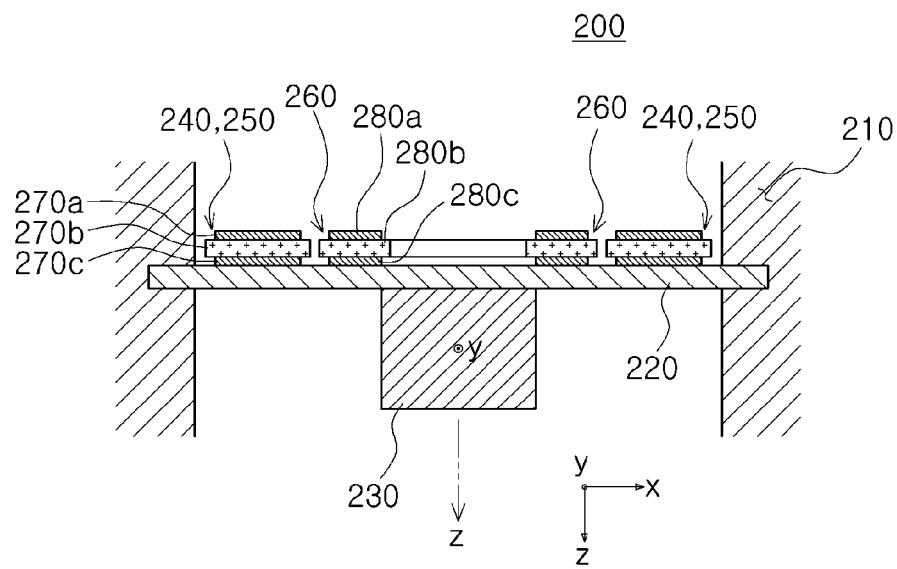
FIG. 9 is a schematic cross-sectional view showing an angular velocity sensor according to an embodiment of the present invention.
Figure 10:
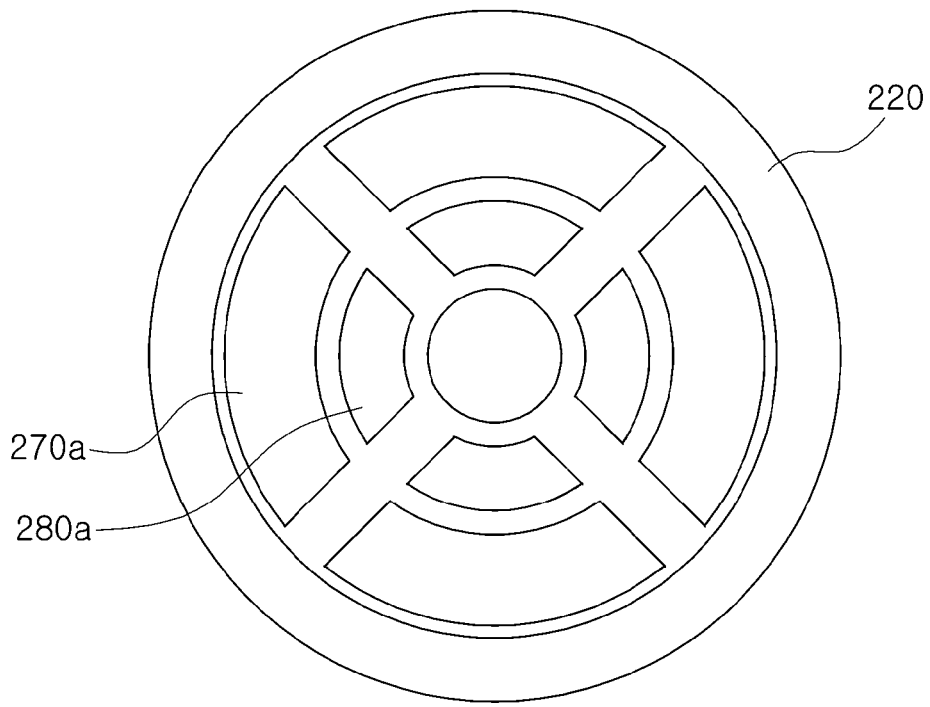
FIG. 10 is a schematic plan view showing the angular velocity sensor according to an embodiment of the present invention.
Figure 11:
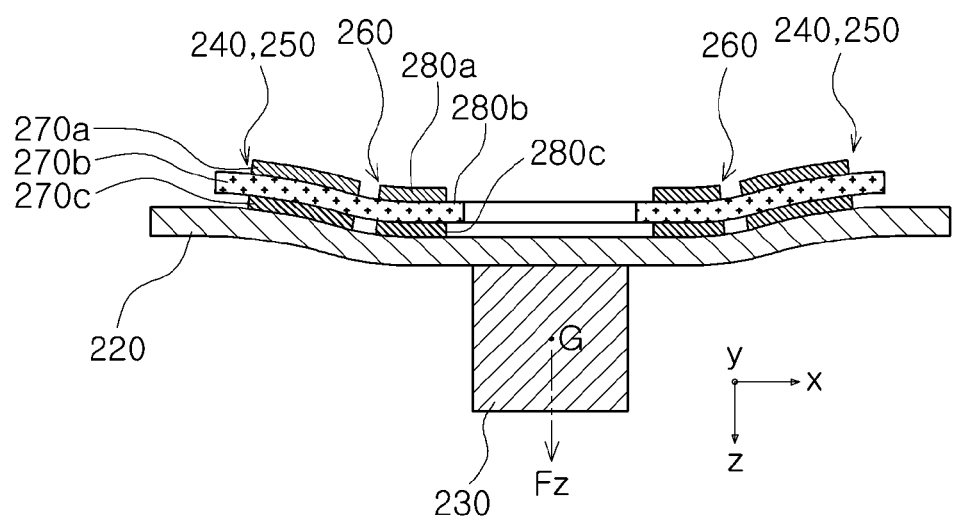
FIGS. 11 and 12 are schematic cross-sectional views for explaining a principle of oscillating an oscillation unit by the driving unit of the angular velocity sensor according to an embodiment of the present invention.
Figure 12:
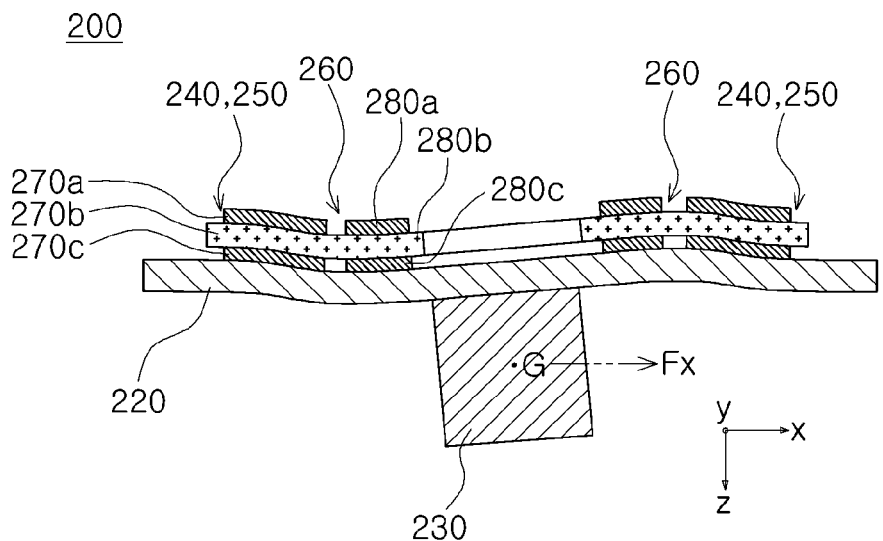

FIG. 9 is a schematic cross-sectional view showing an angular velocity sensor according to an embodiment of the present invention, FIG. 10 is a schematic plan view showing the angular velocity sensor according to an embodiment of the present invention, and FIGS. 11 and 12 are schematic cross-sectional views for explaining a principle of oscillating an oscillation unit by the driving unit of the angular velocity sensor according to an present invention.

Referring to FIGS. 9 and 10, an angular velocity sensor 200 according to the embodiment of the present invention maybe a multi-axis angular velocity sensor oscillating in the x, y, and z-axis directions and may include a fixing part 210, a flexible part 220, a driving unit 240, a sensing unit 250, a control piezoelectric element 260, and an impedance element (not shown).

The flexible part 220 is a disk-shaped substrate having flexibility and the driving unit 240 and the sensing unit 250 formed of the piezoelectric material 270b may be formed on the top surface of the flexible part 220 and the driving unit 240 and the sensing unit 250 may be electrically connected to the control piezoelectric element 260 formed of the piezoelectric material 280b.

In addition, the driving unit 240 and the sensing unit 250 are not defined as any one but may be components relatively determined with respect to the oscillation direction of the oscillation unit 230.

In addition, the driving unit 240 and the sensing unit 250 may be the piezoelectric element including the upper electrode 270a, the piezoelectric material 270b, and the lower electrode 270c, as well as the control piezoelectric element 260.

In this configuration, defining directional terms, left and right directions are defined as an x axis, forward and backward directions are defined as a z axis, and up and down directions are defined as a y axis in cross-sectional views of FIGS. 9 and 11 through 16.

Hereinafter, a multi-axis driving principle will be described.

Referring to FIG. 11, when voltage is applied between the upper electrode 270a and the lower electrode 270c arranged in an x-axis direction, the driving unit 240 may be spread over an xy plane due to the properties of the piezoelectric material 270b as shown in FIG. 11, and thus, the flexible part 220 may be warped.

Therefore, the oscillation unit 230 coupled with the flexible part 220 may be displaced in a positive direction of the z axis.

In this case, when the polarities of voltage applied to the upper electrode 270a and the lower electrode 270c are opposite to each other, the flexibility of the driving unit 240 is reversed and the oscillation unit 230 is displaced in a negative direction of the z axis.

Therefore, the oscillation unit 230 may oscillate on the z axis by applying the above voltage, which may be implemented by applying AC voltage between the upper electrode 270a and the lower electrode 270c opposite to each other.

Next, an oscillating principle in the x-axis direction will be described.

The oscillation in the x-axis direction may use at least one of the electrodes 270a and 270c arranged in the x-axis direction and the electrodes 270a and 270c arranged in the y-axis direction and may vary according to the properties of voltage applied to the upper electrode 270a and the lower electrode 270c.

That is, in order to oscillate the oscillation unit 230 in the x-axis direction, the voltage applied to the upper electrode 270a and the lower electrode 270c may be implemented, unlike the case in which the oscillation unit 230 oscillates in the z-axis direction.

In order words, in order to oscillate the oscillation unit 230 in the x-axis direction, a positive (+) voltage and a negative (−) voltage are applied to the upper electrode 270a and the lower electrode 270c, respectively, disposed at the left and when voltages having the same property are applied to the upper electrode 270a and the lower electrode 270c disposed at the right to implement the z-axis displacement, the opposite voltage may be applied to one of the left and the right in order to implement oscillation in the x axis.

That is, when oscillation in the x axis is implemented by applying a different voltage to the upper electrodes 270a at the left and right, the oscillation in the z axis may be implemented by applying the same voltage to the upper electrodes 270a at the left and right.

In this case, the method of obtaining the displacement of the oscillation unit 230 with respect to the y-axis direction may be the same as the method of obtaining the displacement with respect to the x-axis direction.

That is, the oscillation unit 230 maybe oscillated in the y-axis direction by applying AC signals to the upper electrode 270a and the lower electrode 270c arranged in the y-axis direction.

These characteristics are due to the properties of the piezoelectric material 270b, which provides the flexible characteristics of the piezoelectric material 270b different according to a sign of potential difference applied to the upper electrode 270a and the lower electrode 270c. As a result, these characteristics may be freely selected for oscillation in the x, y, and z-axis directions.

As set forth above, the angular velocity sensor 200 according to the embodiment of the present invention may implement oscillation in the x, y, and z-axis directions. Hereinafter, the sensing unit 250 sensing angular velocity will be described.

Referring to FIG. 12, it is assumed that the Coriolis force Fx in the x-axis direction is applied to the center G of the oscillation unit 230.

Since the measurement of the Coriolis force Fx is performed in a state of applying the oscillation in the y-axis direction, the oscillation unit 230 oscillates in a direction perpendicular to the x-axis direction, but the oscillation phenomenon in the y-axis direction has no effect on the measurement of the Coriolis force Fx in the x-axis direction.

The flexible part 220 may be warped by the Coriolis force Fx and may be deformed as shown in FIG. 12.

As a result, charges having positive or negative polarity may be generated in the upper electrode 270a and the lower electrode 270c by the polarization characteristics of the piezoelectric material 270b disposed in the x-axis direction.

Therefore, the angular velocity may be detected by the detection of charges generated in the upper electrode 270a and the lower electrode 270c.

In addition, when the Coriolis force is applied in the y-axis direction, the angular velocity may be measured by the charges generated from the upper electrode 270a and the lower electrode 270c arranged along the y axis.

Next, even when the Coriolis force Fz is applied in the z-axis direction, the angular velocity may be measured by the charges generated from the upper electrode 270a and the lower electrode 270c arranged along the x axis or the y axis.

Summarizing the above-mentioned principle of sensing angular velocity, the oscillation unit 230 may oscillate in any one of x, y, and z-axis directions by applying the AC signals to the upper electrode 270a and the lower electrode 270c disposed on the top surface of the flexible part 220. At this time, the angular velocity in each axis direction may be measured by measuring voltage using charges generated by any one of the Coriolis forces Fx, Fy, and Fz in each axis direction in which they are generated.

In this case, the control piezoelectric element 260 maybe disposed to be adjacent to the upper electrode 270a, the piezoelectric material 270b, and the lower electrode 270c disposed in the x and y-axis directions, and the impedance element (not shown) electrically connected to the control piezoelectric element 260 may be formed.

Therefore, as described above, the rigidity for each direction of the flexible part 220 may be controlled by controlling the impedance of the impedance element (not shown), such that the resonance frequencies of the driving mode and the sensing mode may be controlled.

As a result, the angular velocity sensor 200 according to the embodiment of the present invention having improved sensitivity characteristics by controlling the impedance of the impedance element (not shown) so that the resonance frequency of the driving mode and the resonance frequency of the sensing mode approximate each other may be implemented.

FIGS. 13 through 16 are schematic cross-sectional views showing an angular velocity sensor according to a modified embodiment of the present invention.

Figure 13:
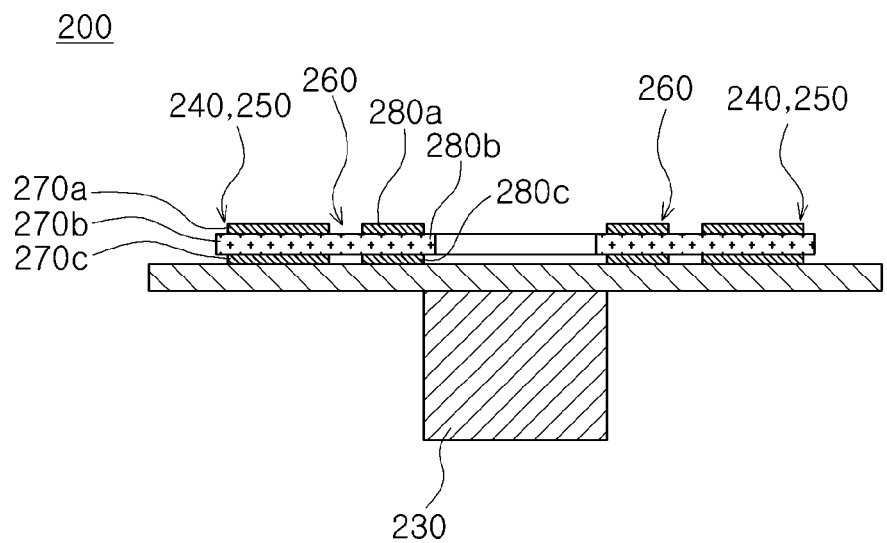
FIGS. 13 through 16 are schematic cross-sectional views showing an angular velocity sensor according to a modified embodiment of the present invention.

Referring to FIG. 13, the piezoelectric element including the upper electrode 270a, the piezoelectric material 270b, and the lower electrode 270c that serve as the driving unit 240 or the sensing unit 250 may be connected or integrally formed with the piezoelectric material 280b of the control piezoelectric element 260 adjacent thereto.

In this case, when a distance between the electrodes 270a and 270c of the driving unit 240 or the sensing unit 250 and the electrodes 280a and 280c of the control piezoelectric element 260 is equal to or greater than a predetermined distance, the influence therebetween may be disregarded, and therefore, the above components may be connected to each other or may be integrally formed therewith.

Figure 14:
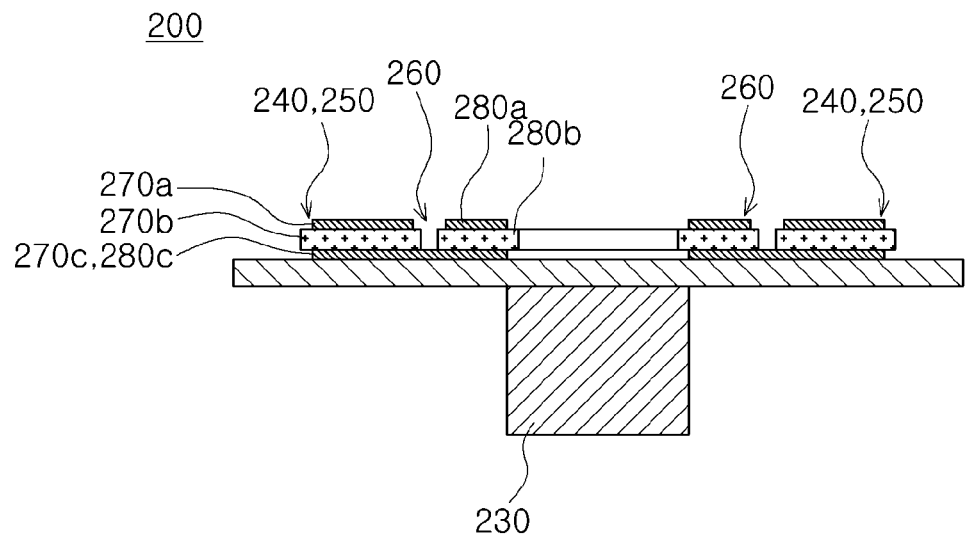

Referring to FIG. 14, the piezoelectric element including the upper electrode 270a, the piezoelectric material 270b, and the lower electrode 270c that serve as the driving unit 240 or the sensing unit 250 may be connected to the lower electrode 280c of the control piezoelectric element 260 adjacent thereto or may be integrally formed therewith.

Figure 15:
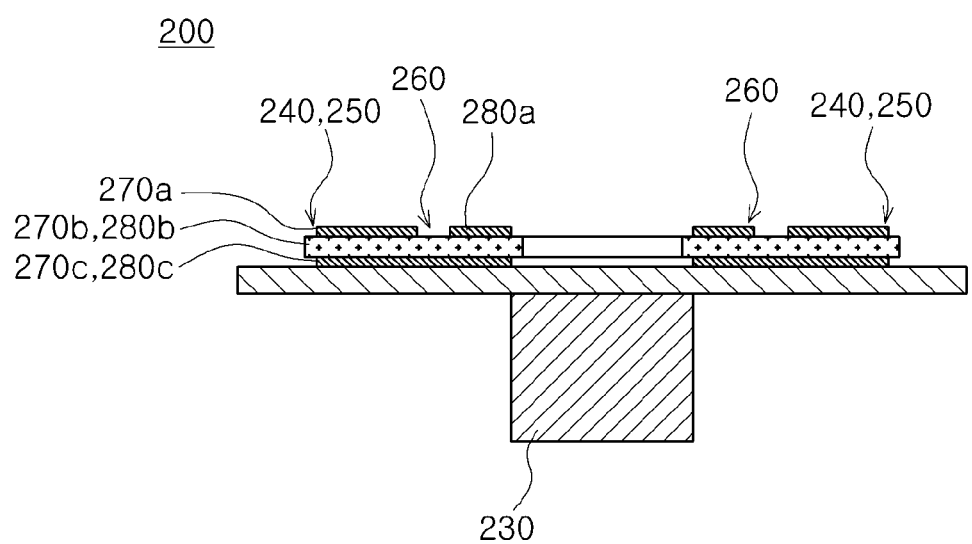

Referring to FIG. 15, the piezoelectric element including the upper electrode 270a, the piezoelectric material 270b, and the lower electrode 270c that serve as the driving unit 240 or the sensing unit 250 may be connected or integrally formed with the piezoelectric material 280b and the lower electrode 280c of the control piezoelectric element 260 adjacent thereto.

Figure 16:
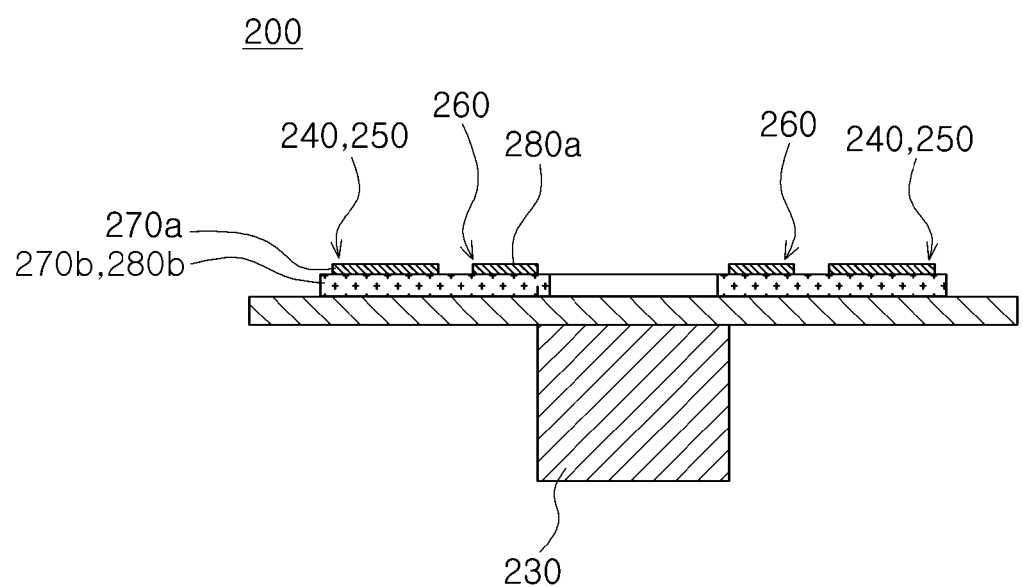

Referring to FIG. 16, the lower electrode of the driving unit 240 or the sensing unit 250 and the lower electrode of the control piezoelectric element 260 may be replaced with the flexible part 220.

However, the piezoelectric materials 270b and 280b may be connected to each other and may be configured separately.

Figure 17:
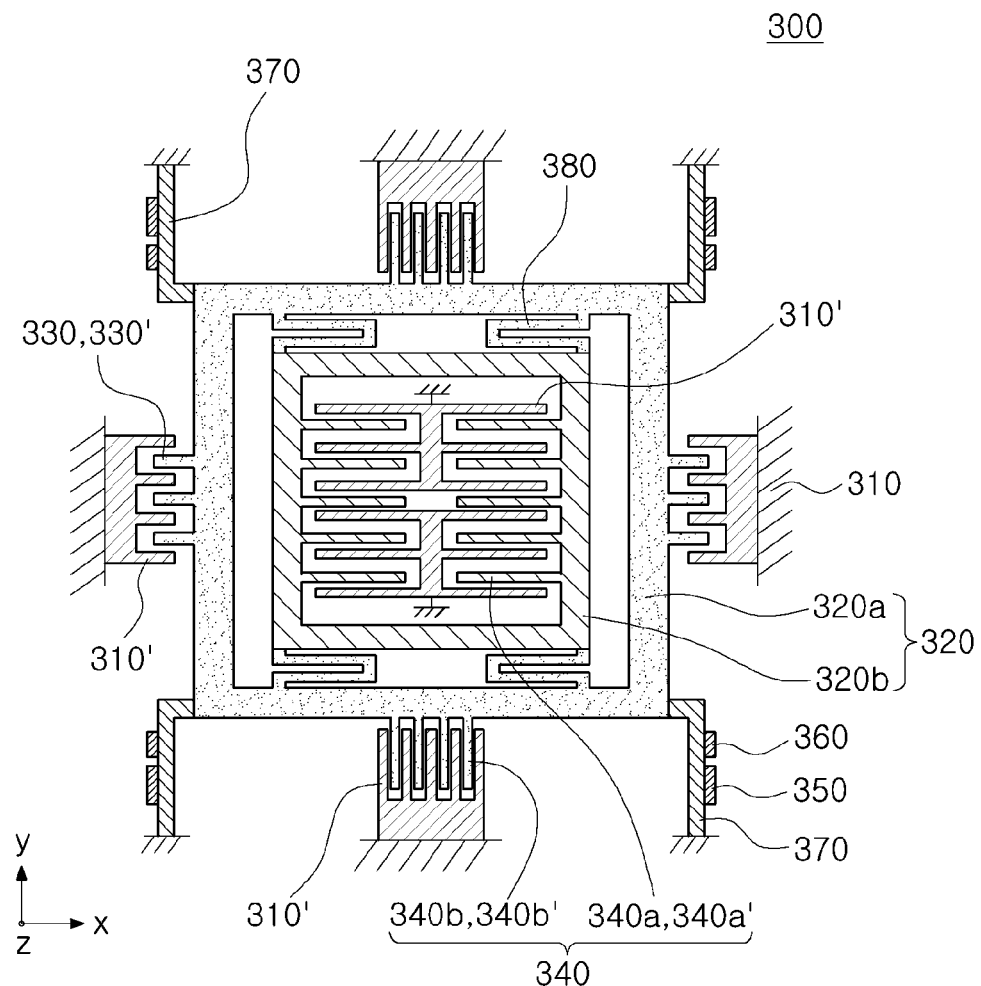
FIG. 17 is a schematic plan view showing a case in which a control piezoelectric element and an impedance element are applied to a capacitive angular velocity sensor.

FIG. 17 is a schematic plan view showing a case in which the control piezoelectric element and the impedance control part are applied to a capacitive angular velocity sensor.

In this case, defining terms for directions, left and right directions are defined as an x-axis, up and down directions are defined as a y-axis, and forward and backward directions are defined as a z-axis in FIG. 17.

Referring to FIG. 17, an angular velocity sensor 300 according to an embodiment of the present invention may include an oscillation unit 320 including a fixing part 310, a first mass body 320a and a second mass body 320b, a driving unit 330 for driving the first mass body 320a, a sensing unit 340 for sensing displacement in vertical and horizontal directions of the first mass body 320a and the second mass body 320b, a control piezoelectric element 350, and an impedance element 360.

The first mass body 320a may have a square frame shape and may be floated to oscillate on the fixing part 310.

Each corner of the first mass body 320a is provided with a first flexible part 370 and the first mass body 320a may be connected to the fixing part 310 by the first flexible part 370.

The second mass body 320b has a square frame having a size smaller than that of the first mass body 320a and may be floated to oscillate on the fixing part 310.

In this case, the second mass body 320b may be disposed in an inner space of the first mass body 320a and the second mass body 320b may be fixed to the first mass body 320a by the second flexible part 380.

The driving units 330 may mounted at the sides of the first mass body 320a, and may be formed on the same plane as the first mass body 320a on the fixing part 310.

In this configuration, the fixing part 310 may include a fixing electrode 310' and the driving unit 330 may be a moving electrode 330' to deform the first flexible part 370 by the electrostatic force with the fixing electrode 310' at the time of applying the external AC voltage so as to form the capacitance element with the fixing electrode 310'.

The fixing electrode 310' and the moving electrode 330' maybe interconnected with each other by an interdigitated structure.

The sensing unit 340 may include a horizontal sensing unit 340a or a vertical sensing unit 340b, wherein the vertical sensing units 340b may be mounted on the sides of the first mass body 320a, respectively.

The vertical sensing unit 340b may be a moving electrode 340b' that is interconnected with the fixing electrode 310' provided on the fixing part 310 by the interdigitated structure.

The horizontal sensing unit 340a may be mounted in the inner space of the second mass body 320b and maybe a moving electrode 340a' that is interconnected with the fixing electrode 310' provided on the fixing part 310 by the interdigitated structure, similar to the vertical sensing unit 340b.

In this case, when the AC voltage is applied to the moving electrode 330' of the driving unit 330 and the fixing electrode 310' of the fixing unit 310, the first mass body 320a oscillates in the x-axis direction by the electrostatic force.

In this case, the second mass body 320b is relatively fixed to the first mass body 320a in the x-axis direction by the second flexible part 380, such that it oscillates in the x-axis direction together with the first mass body 320a.

Herein, when the angular velocity is applied to the first mass body 320a in the z-axis direction while the first and second mass bodies 320a and 320b oscillate, the Coriolis force in the y-axis direction is applied to the second mass body 320b and the second mass body 320b moves in the y-axis direction.

Therefore, a change in a distance between the moving electrode 340a' of the horizontal sensing unit 340a and the fixing electrode 310' of the fixing part 310 occurs and thus, the change in capacitance between the moving electrode 340a' of the horizontal sensing unit 340a and the fixing electrode 310' of the fixing part 310 occurs according to the change in distance.

Similarly, the change in capacitance may occur in the vertical sensing unit 340b.

Therefore, the magnitude in the angular velocity may be calculated by measuring the change in capacitance.

In this case, the control piezoelectric element 350 may be formed in at least one of the first flexible part 370 and the second flexible part 380 and the rigidity thereof may be controlled by electrically connecting the impedance element 360 to the control piezoelectric element 350, such that the resonance frequency of the driving mode and the sensing mode may be controlled.

That is, the difference Δf of the resonance frequency of the driving mode and the resonance frequency of the sensing mode maybe controlled by controlling the impedance of the impedance element 360.

From the above description, the angular velocity sensors 100, 200, and 300 according to the embodiments of the present invention include the control piezoelectric elements A, B, C, D, 260 and 350 for controlling the resonance frequency and the impedance elements A', B', C', D', 360 electrically connected to the control piezoelectric elements A, B, C, D, 260 and 350 to apply the impedance to the control piezoelectric elements A, B, C, D, 260 and 350 to passively tune the resonance frequencies without additional power consumption or the application of high voltage, thereby correcting the errors of the resonance frequencies of the driving mode and the sensing mode and significantly increasing the sensitivity characteristics.

In addition, the embodiments of the present invention can correct the changes in the resonance frequency due to manufacturing distribution, the environment, and the lapse of time when mass produced, thereby improving yield and stability characteristics.

In addition, it is to be noted that the piezoelectric sensing method and the piezoresistive sensing method can be performed when simultaneously measuring angular velocity and acceleration by demodulating the signal of the driving frequency f from the Coriolis force according to the angular velocity input and the DC or the low frequency signal from the inertial force according to the acceleration input.

As set forth above, according to the angular velocity sensor according to embodiments of the present invention, errors in the resonance frequencies of the driving mode and the sensing mode can be corrected without requiring additional power consumption or the application of high voltage, thereby substantially increasing the sensitivity characteristics.

More particularly, according to embodiments of the present invention, the change in the resonance frequency due to manufacturing distribution, the environment, and the lapse of time when mass produced, maybe corrected, thereby improving yield and stability characteristics.

While the present invention has been shown and described in connection with the embodiments, it will be apparent to those skilled in the art that modifications and variations can be made without departing from the spirit and scope of the invention as defined by the appended claims.

What is claimed is:

1. An angular velocity sensor, comprising:
    a flexible part connecting a fixing part to an oscillation unit;
    a driving unit formed on the flexible part or the oscillation unit to oscillate the oscillation unit;
    a sensing unit formed on the flexible part or the oscillation unit to sense a displacement of the oscillation unit according to an angular velocity input;
    a control piezoelectric element formed on the flexible part to control rigidity of a motion of the oscillation unit; and
    an impedance element electrically connected to the control piezoelectric element to apply impedance to the control piezoelectric element.

2. The angular velocity sensor of claim 1, further comprising:
    a control unit controlling the impedance value of the impedance element,
    wherein the impedance value of the impedance element is set in advance or is variable by the control unit.

3. The angular velocity sensor of claim 1, wherein the impedance element is a potentiometer, a varistor, and/or a trimmable resistor.

4. The angular velocity sensor of claim 1, wherein the driving unit includes a piezoelectric material formed on the flexible part and deforming the flexible part by an external alternating current (AC) voltage.

5. The angular velocity sensor of claim 1, wherein the fixing part includes a fixing electrode, and
    the driving unit is a moving electrode forming a capacitance element with the fixing electrode to deform the flexible part by electrostatic force at the time of applying the external AC voltage.

6. The angular velocity sensor of claim 1, wherein the sensing unit includes a piezoelectric material or a piezoresistive element formed on the flexible part to output electrical signals according to the deformation of the flexible part.

7. The angular velocity sensor of claim 1, wherein the fixing part includes a fixing electrode, and
    the sensing unit is a moving electrode forming a capacitance element with the fixing electrode to output electrical signals according to the displacement of the oscillation unit.

8. The angular velocity sensor of claim 1, wherein the control piezoelectric element includes an upper electrode, a lower electrode coupled with the flexible part, and a piezoelectric material disposed between the upper electrode and the lower electrode.

9. The angular velocity sensor of claim 8, wherein the impedance element is electrically connected to the upper electrode and the lower electrode.

10. The angular velocity sensor of claim 8, wherein the driving unit and/or the sensing unit includes an upper electrode, a lower electrode coupled with the flexible part, and a piezoelectric material disposed between the upper electrode and the lower electrode.

11. The angular velocity sensor of claim 10, wherein the upper electrode, the lower electrode, and/or the piezoelectric material of the driving unit or the sensing unit is connected to correspond to the upper electrode, the lower electrode, and/or the piezoelectric material of the control piezoelectric element and is integrally formed therewith.

12. An angular velocity sensor, comprising:
first and second flexible parts connecting a fixing part to an oscillation unit;
a driving unit formed on the first flexible part or the oscillation unit to oscillate the oscillation unit;
a sensing unit formed on the second flexible part or the oscillation unit to sense a displacement of the oscillation unit according to an angular velocity input;
a control piezoelectric element formed on the first flexible part and/or the second flexible part to control rigidity of the driving unit or the sensing unit; and
an impedance element electrically connected to the control piezoelectric element o apply impedance to the control piezoelectric element.

13. The angular velocity sensor of claim 12, further comprising:
a control unit controlling the impedance value of the impedance element,
wherein the impedance value of the impedance element is set in advance or is variable by the control unit.

14. The angular velocity sensor of claim 12, wherein the impedance element is a potentiometer, a varistor, and/or a trimmable resistor.

15. The angular velocity sensor of claim 12, wherein the driving unit oscillates the oscillation unit in a first direction and the sensing unit senses the displacement of the oscillation unit oscillating in a third direction that is a direction of a cross product of the first direction and the second direction according to an angular velocity input in the second direction.

16. The angular velocity sensor of claim 12, wherein the first and second flexible parts, the driving unit, the sensing unit, the control piezoelectric element, and the impedance elements are formed in plural.

17. The angular velocity sensor of claim 12, wherein the driving unit includes a piezoelectric material formed on the first flexible part and deforming the first flexible part by an external AC voltage.

18. The angular velocity sensor of claim 12, wherein the fixing part includes a fixing electrode, and
the driving unit is a moving electrode forming a capacitance element with the fixing electrode to deform the first flexible part by electrostatic force at the time of applying the external AC voltage.

19. The angular velocity sensor of claim 12, wherein the sensing unit includes a piezoelectric material or a piezoresistive element formed on the second flexible part to output electrical signals according to the deformation of the second flexible part.

20. The angular velocity sensor of claim 12, wherein the fixing part includes a fixing electrode, and
the sensing unit is a moving electrode forming a capacitance element with the fixing electrode to output electrical signals according to the displacement of the oscillation unit.

21. The angular velocity sensor of claim 12, wherein the control piezoelectric element includes an upper electrode, a lower electrode coupled with the flexible part, and a piezoelectric material disposed between the upper electrode and the lower electrode.

22. The angular velocity sensor of claim 21, wherein the driving unit and/or the sensing unit includes an upper electrode, a lower electrode coupled with the flexible part, and a piezoelectric material disposed between the upper electrode and the lower electrode.

23. The angular velocity sensor of claim 22, wherein the upper electrode, the lower electrode, and/or the piezoelectric material of the driving unit or the sensing unit is connected to correspond to the upper electrode, the lower electrode, and/or the piezoelectric material of the control piezoelectric element and is integrally formed therewith.

* * * * *